UNITED STATES PATENT OFFICE.

PAUL JULIUS AND ERNST FUSSENEGGER, OF LUDWIGSHAFEN-ON-THE-RHINE, AND LOUIS BLANGEY, OF MANNHEIM, GERMANY, ASSIGNORS TO BADISCHE ANILIN & SODA FABRIK, OF LUDWIGSHAFEN-ON-THE-RHINE, GERMANY, A CORPORATION.

AZO DYES.

1,188,545.  Specification of Letters Patent.  Patented June 27, 1916.

No Drawing.  Application filed July 9, 1914.  Serial No. 849,873.

*To all whom it may concern:*

Be it known that we, PAUL JULIUS and ERNST FUSSENEGGER, citizens of the Austrian Empire, residing at Ludwigshafen-on-the-Rhine, Germany, and LOUIS BLANGEY, a citizen of the Swiss Empire, residing at Mannheim, Germany, have invented new and useful Improvements in Azo Dyes, of which the following is a specification.

We have discovered new azo dyes which we can obtain by combining a diazo compound which is free from salt-forming groups with a derivative of 1-amino-7-naphthol possessing a constitution corresponding to the formula:—

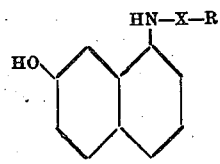

in which X represents an oxygen-containing group consisting of more than one atom and less than four atoms which may be referred to as a simple divalent acidyl group containing oxygen and R is an aromatic residue. Under the term "diazo compound" we include both an ordinary diazo compound, also a diazoazo compound and a tetrazo compound. Our new coloring matters can be produced as such, or on the fiber, or they can be made into lakes. The said new coloring matters are insoluble in water and possess excellent properties in particular, brilliant shades having excellent or very good fastness against the action of light and washing and of chlorin. They possess from red to blue shades and upon reduction with stannous chlorid, they give rise to an amin which is free from salt-forming groups and also to a derivative of 1.8-diamino-7-naphthol. Those coloring matters obtainable from ortho-chlorbenzoyl-1-amino-7-naphthol give, on reduction with stannous chlorid, a derivative of 1.8-diamino-7-naphthol containing the residue

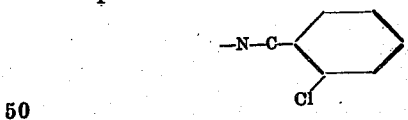

The production of some derivatives of 1-amino-7-naphthol of the aforesaid type, which are suitable for use according to the present invention, is described in the specification of our application Serial No. 849,872 of even date herewith.

The following examples will serve to illustrate further the nature of this invention, which, however, is not limited to these examples.

Example 1: Pad cotton with a solution containing 30 grams of ortho-chlorbenzoyl-1-amino-7-naphthol, 20 cubic centimeters of 28 per cent. caustic soda solution and 50 cubic centimeters of Turkey red oil in each liter and then, either directly or after drying, treat the material with a diazo solution which has been prepared from 14 grams of ortho-nitranilin in each liter and to which has been added an excess of sodium acetate. The dye obtained which possesses a constitution corresponding to the formula

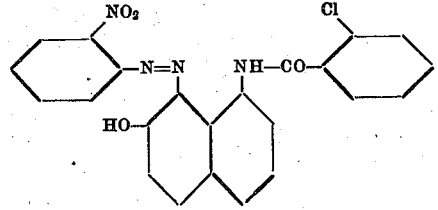

has a brilliant shade very nearly resembling Turkey red and is of excellent fastness against the action of washing, chlorin, and light. On reducing the coloring matter of this example with stannous chlorid, o-phenylene diamin is obtained and also a derivative of 1.8-diamino-7-naphthol containing the residue

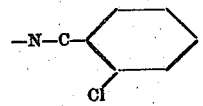

Example 2: Proceed as in the foregoing example 1, but using instead of the ortho-chlor-benzoyl-1-amino-7-naphthol, an equivalent quantity of 2.4-dichlor-benzoyl-1-amino-7-naphthol, and instead of the ortho-nitranilin, nitro-anisidin $$(OCH_3 : NH_2 : NO_2 = 1 : 2 : 5).$$

A brilliant bordeaux is obtained which is of excellent fastness against the action of washing, chlorin and light.

Example 3: Pad cotton with a solution containing 33 grams of para-chlor-benzene-sulfonyl-1-amino-7-naphthol, 20 cubic centimeters of 28 per cent. caustic soda solution and 50 cubic centimeters of Turkey red oil in each liter and then, either directly or after drying, treat the material with a diazo solution obtained from 16 grams of chloranisidin

 (OCH₃:NH₂Cl=1:2:4)

in each liter, to which has been added an excess of sodium acetate. By this means, bluish-red shades of very good fastness against washing, chlorin and light are obtained.

Example 4: In the foregoing example 3, instead of the para-chlor-benzene-sulfonyl-1-amino-7-naphthol, use para-toluene-sulfonyl-1-amino-7-naphthol, and instead of the chlor-anisidin, use ortho-nitranilin. Scarlet shades of excellent fastness are then obtained. In a similar manner other diazo, or diazoazo, or tetrazo, compounds can be employed, and other derivatives of 1-amino-7-naphthol of the aforesaid type can be employed.

The following table gives some of the shades obtainable from various combinations according to this invention.

| Component. | Melting point degrees centigrade. | Diazo compound from— | Shade. |
|---|---|---|---|
| Benzoyl-1-amino-7-naphthol | 208–209° | Aminoazobenzene | Violet-red. |
| Ortho-chlorbenzoyl-1-amino-7-naphthol | 157–158° | Ortho-nitranilin | Turkey-red. |
| Do | do | Nitro-toluidin (CH₃:NH₂:NO₂=1:4:3) | Red. |
| Do | do | Nitro-anisidin (OCH₃:NH₂:NO₂=1:2:5) | Red with bluish tinge. |
| Do | do | Alpha-amino-anthraquinone | Red. |
| Para-chlorbenzoyl-1-amino-7-naphthol | 230–231° | Nitro-anisidin (OCH₃:NH₂:NO₂=1:2:5) | Red with bluish tinge. |
| 2.4-Dichlor-benzoyl-1-amino-7-naphthol | 182–183° | do | Bordeaux. |
| Do | do | Para-nitranilin | Scarlet. |
| Do | do | Chlor-anisidin (OCH₃:NH₂:Cl=1:2:4) | Turkey-red. |
| Do | do | Beta-amino-anthraquinone | Bordeaux. |
| 2.6-Dichlorbenzoyl-1-amino-7-naphthol | 230–232° | Ortho-nitranilin | Scarlet with yellowish tinge. |
| Meta-nitro-benzoyl-1-amino-7-naphthol | 204–205° | Nitro-anisidin (OCH₃:NH₂:NO₂=1:2:5) | Bordeaux. |
| Do | do | Dianisidin | Indigo. |
| Para-toluene-sulfonyl-1-amino-7-naphthol | 213–214° | Ortho-nitranilin | Scarlet. |
| Para-chlor-benzene-sulfonyl-1-amino-7-naphthol | 213–214° | Chlor-anisidin (OCH₃:NH₂:Cl=1:2:4) | Bluish-red. |

Now what we claim is:—

1. The new azo coloring matters obtainable from a diazo compound which is free from salt-forming groups and a derivative of 1-amino-7-naphthol corresponding to the formula:—

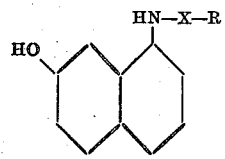

in which X represents a divalent acidyl group containing oxygen, and R is an aromatic residue, which new coloring matters consist when dry of red to blue powders, which are insoluble in water, and on reduction with stannous chlorid give rise to an amin which is free from salt-forming groups and to a derivative of 1.8-diamino-7-naphthol.

2. The new azo coloring matters obtainable from a diazo-compound which is free from salt-forming groups and a derivative of 1-amino-7-naphthol corresponding to the formula:—

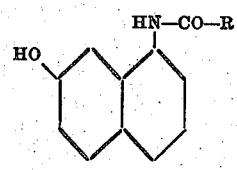

in which R represents an aromatic residue, which new coloring matters consist when dry of from red to blue powders, are insoluble in water, are free from sulfur and upon reduction with stannous chlorid give rise to an amin which is free from salt-forming groups and to a derivative of 1.8-diamino-7-naphthol containing a second carbon atom attached to the nitrogen atom of position 1.

3. The new azo coloring matter obtainable from a diazo compound which is free from salt-forming groups and a derivative of 1-amino-7-naphthol corresponding to the formula:—

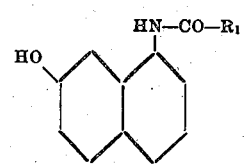

in which R₁ represents a halogenated benzene residue, which new coloring matters consist when dry of from red to blue powders, are insoluble in water and free from sulfur and on reduction with stannous chlorid give rise to an amin, which is free from salt-forming groups, and to a derivative of 1.8-diamino-7-naphthol, which contains halogen and which also contains a second carbon atom attached to the nitrogen atom of position 1.

4. The new coloring matters obtainable from a diazo compound free from salt-forming groups and ortho-chlor-benzoyl-1-amino-7-naphthol, which new coloring matters consist when dry of reddish powders, which are insoluble in water, are free from sulfur, and on reduction with stannous chlorid give rise to an amin which is free from salt-forming groups, and to a derivative of 1.8-diamino-7-naphthol containing the residue

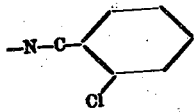

5. The new coloring matter obtainable by combining diazotized ortho-nitranilin with ortho-chlor-benzoyl-1-amino-7-naphthol, and possessing a constitution corresponding to the formula

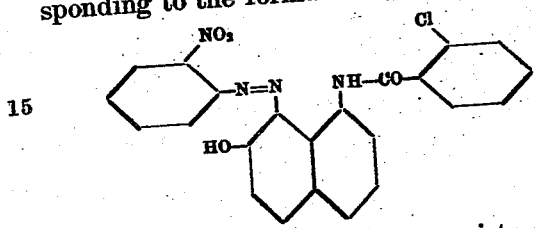

which new coloring matter consists when dry of a Turkey red powder, is insoluble in water, and on reduction with stannous chlorid gives rise to ortho-phenylene-diamin and to a derivative of 1.8-diamino-7-naphthol containing the residue

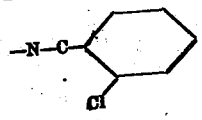

In testimony whereof we have hereunto set our hands in the presence of two subscribing witnesses.

PAUL JULIUS.
ERNST FUSSENEGGER.
LOUIS BLANGEY.

Witnesses:
J. ALEC. LLOYD,
H. MERLE COCHRAN.